A. N. PUTNEY.
FISH STRINGER.
APPLICATION FILED OCT. 21, 1919.
1,341,722.
Patented June 1, 1920.
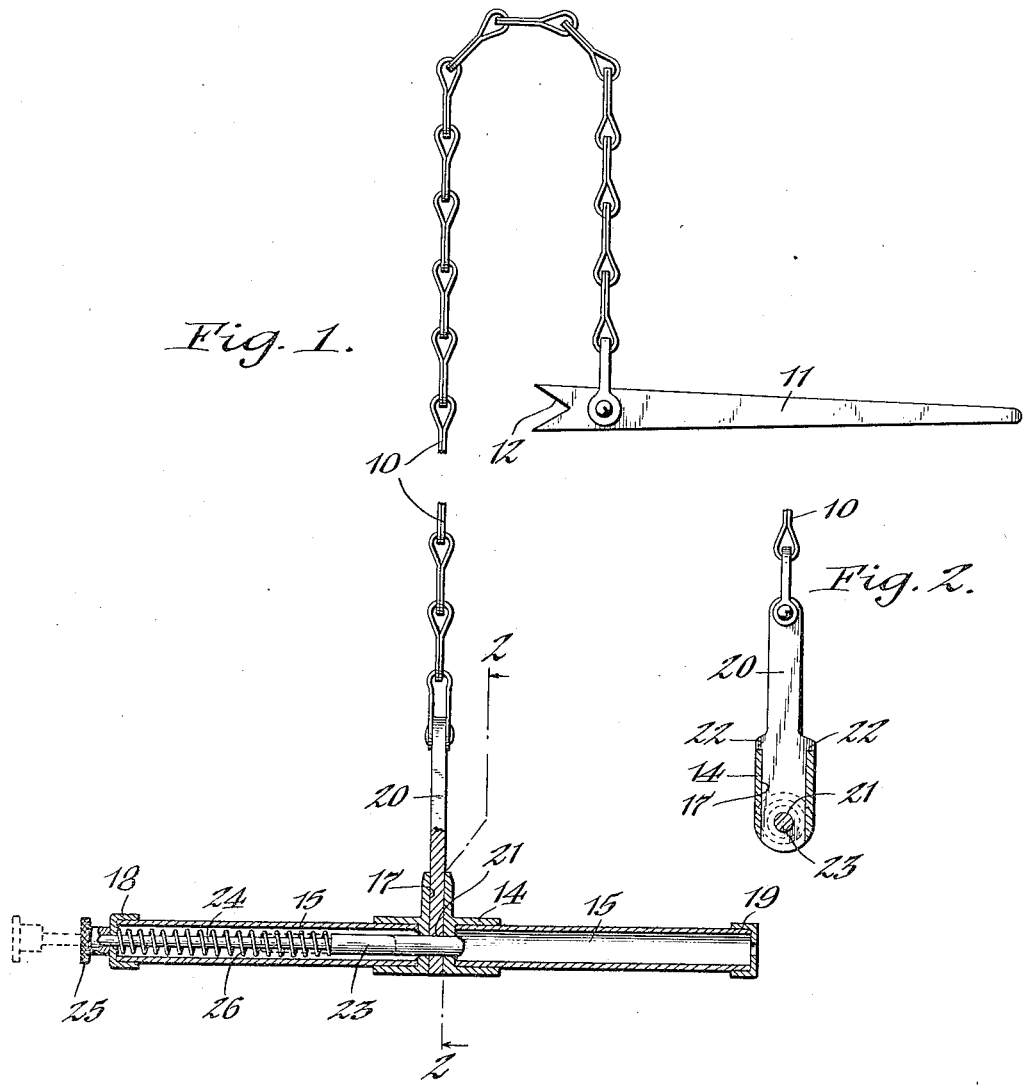

UNITED STATES PATENT OFFICE.

ALBERT N. PUTNEY, OF SYRACUSE, NEW YORK.

FISH-STRINGER.

1,341,722.  Specification of Letters Patent.  Patented June 1, 1920.

Application filed October 21, 1919. Serial No. 332,353.

*To all whom it may concern:*

Be it known that I, ALBERT N. PUTNEY, a citizen of the United States, residing at Syracuse, in the county of Onondaga and State of New York, have invented new and useful Improvements in Fish-Stringers, of which the following is a specification.

This invention relates to a device for stringing fish after the same have been caught for the purpose of keeping them together and also for convenience in carrying them.

It is the object of this invention to provide a device of this character with improved means whereby the fish are reliably retained on the stringing line but can be quickly and easily removed therefrom at the lower end of the line in a mass, these retaining means being so constructed that they are not liable to get out of order and can be readily assembled and dismembered.

In the accompanying drawings:

Figure 1 is a sectional elevation of the fish stringer embodying my improvements. Fig. 2 is a cross section of the same on line 2—2, Fig. 1.

Similar characters of reference refer to like parts in both views.

10 represents the stringing line upon which the fish are strung and which may be of any suitable construction, for instance, the same may have the form of a chain as shown in the drawings. At its upper end this stringing line is provided with a stringing needle 11 which has a pointed front end for convenience in passing the same through the gills of fishes while its rear end is wide and pivotally connected with the upper end of the stringing line. The rear end of the stringing needle is preferably provided with a notch 12 of V-shape so that the same may be used as a disgorger for removing hooks from the mouths of fishes.

At its lower end the stringing line is provided with means whereby the fish may be retained on the stringing line or released therefrom. These means in their preferred form are constructed as follows:

Arranged transversely of the lower end of the stringing line is a cross bar which comprises a central section 14 and two end sections 15, 15 of tubular form secured at their opposing inner ends to opposite ends of the central section. The central section is provided with a transverse socket 17 which opens through opposite external sides of the central cross bar section and within its central part the same communicates with the inner ends of the tubular end sections of the cross bar. At their outer ends the tubular sections are provided with heads or caps 18, 19 which may be secured thereto in any suitable manner.

20 represents a coupling hasp preferably of flat metal which is connected at its upper end with the lower end of the stringing line and at its lower end with a locking opening 21 while its intermediate part is provided with a pair of downwardly facing stop shoulders 22 which are arranged on opposite longitudinal edges of the hasp. Upon inserting this hasp into the socket of the cross bar from the top thereof until the stops 22 engage with the upper end of the socket, the locking opening in the hasp will be in line with the bore of the tubular sections of the cross bar and the lower end of the hasp will extend to the lower side of the cross bar, as shown in Fig. 1.

The hasp is detachably connected with the cross bar by a locking device which in the preferred form shown in the drawings comprises a locking pin or catch 23 movable lengthwise in the cross bar across the socket thereof and through the locking opening of the hasp, a longitudinal shifting rod 24 arranged within one of the tubular sections and connected at its inner end with the locking pin while its outer end passes through an opening in the cap 18, a finger piece or button 25 secured to the outer end of the shifting rod, and a spring 26 surrounding the shifting rod and bearing at its inner end against the locking pin and at its outer end against the cap 18 so that this spring operates to hold the locking pin yieldingly in its inner operative position in which the same interlocks with the hasp and connects the same with the cross bar.

When thus assembled the cross bar is reliably connected with the stringing line so that the fish will be properly supported on the line as they are successively strung thereon by the needle. For the purpose of releasing the fish *en masse* from the line it is only necessary to withdraw the locking pin from the hasp whereby the cross bar will be detached therefrom and permit the fish to slide off the line.

By extending the hasp entirely through the cross bar any dirt which may get into the socket will be ejected from the lower end thereof and thus prevent interference with the fastening of these parts together.

I claim as my invention:

1. A fish stringer comprising a stringing line, a coupling hasp connected with said line and provided with an opening, a tubular cross bar provided between its ends with a transverse socket which receives said hasp, and a locking pin or catch slidable lengthwise in said bar and operable from the exterior of said bar and adapted to engage the opening of said hasp for detachably connecting the same with said bar.

2. A fish stringer comprising a stringing line, a coupling hasp connected with said line and provided with an opening, a tubular cross bar provided between its ends with a transverse socket which receives said hasp, and a spring arranged within said bar and operating to hold said catch yieldingly in its operative position.

3. A fish stringer comprising a stringing line, a coupling hasp connected with said line and provided with an opening, a tubular cross bar provided between its ends with a transverse socket which receives said hasp, a locking pin or catch slidable lengthwise in said bar and adapted to engage the opening of said hasp for detachably connecting the same with said bar, a shifting rod arranged within said bar and connected at its inner end with said catch and provided at its outer end with a finger piece or button, and a spring arranged within said bar and bearing at one end against said catch and at its other end against an internal bearing on the cross bar.

4. A fish stringer comprising a stringing line, a tubular cross bar provided between its ends with a socket which intersects the tubular bore of said cross bar and extends through opposite sides of said bar, a coupling hasp connected with said line and fitting into said socket so as to extend from one side of the cross bar to the other having a stop engaging with the outer side of said socket and a locking opening registering with the bore of said cross bar, a locking pin movable lengthwise in said cross bar into and out of engagement from said locking opening in the hasp, a head arranged on said cross bar, a shifting rod arranged within said cross bar and connected at its inner end with said locking pin and passing with its outer end through said head, a finger piece arranged on the outer end of said rod, and a spring surrounding said rod within said cross bar and bearing at its inner end against said pin and at its outer end against said head.

ALBERT N. PUTNEY.